United States Patent Office 3,153,090
Patented Oct. 13, 1964

3,153,090
PROCESS FOR THE PRODUCTION OF OXIMES
Lawrence R. Jones, Terre Haute, Ind., assignor to Commercial Solvents Corporation, New York, N.Y., a corporation of Maryland
No Drawing. Filed Sept. 8, 1961, Ser. No. 136,738
8 Claims. (Cl. 260—566)

My invention relates to oximes and more particularly it relates to a new process for the production of oximes. Oximes have a wide variety of use. For example, methylethylketoxime is used as an anti-skinning agent in coatings while cyclohexanone oxime is the intermediate from which caprolactam is obtained by the so called Beckmann rearrangement. Previously such oximes have been prepared in a variety of ways. For example, one procedure disclosed by Grundmann (Angew. Chem. 62, 558–1950) shows production of cyclohexanone oxime by the reduction of nitrocyclohexane.

I have now discovered a new process for the production of oximes. Thus my invention is the foundation of a valuable new means for obtaining this important type of compound. My invention not only provides merely an alternate method for producing oximes but furnishes an economical method wherein oximes can be produced in high yields.

My new process consists essentially of dissolving in sulfuric acid, an ester having the following formula:

$$\underset{|}{\overset{NO_2}{\phantom{X}}}\phantom{X}\underset{\phantom{X}}{\overset{O}{\phantom{X}}}$$
$$R-CH_2-O-\overset{\|}{C}-R^1$$

wherein R is either cycloalkyl or the radical:

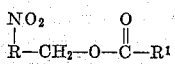

wherein $R^1$ is alkyl and permitting the temperature to rise until the oxime is produced. Since my reaction is exothermic, no external source of heat is required. Among the oximes which can be produced according to my process are those oximes of the general formula R=NOH wherein R has the above-described meaning, e.g. cyclohexanone oxime, methylethylketoxime, dimethylketoxime, diethylketoxime, etc., and the like. Suitable esters which can be utilized in producing the desired oximes include nitrocyclohexanemethyl acetate, 2 - nitro-2-methylpropyl propionate, 2-nitro-2-methylpropyl acetate, 2-nitro-2-ethylpropyl acetate, 3-nitro-3-ethylbutyl butyrate, etc., and the like.

In conducting my process, any suitable concentrations of sulfuric acid, even those in excess of 100%, i.e., an excess of $SO_3$ can be employed. Generally, however, I prefer to utilize concentrations from about 50 to about 100% of sulfuric acid. The reaction takes place at temperatures as low as 0° C. and temperatures up to and above 100° C. However, it is generally preferable for maximum yields, to utilize temperatures ranging from about room temperature to about 80° C.

In carrying out my process for the production of oximes I prefer to continuously add the ester to sulfuric acid and for any given quantity of acid, I prefer to continue to add the ester until the solution becomes so dilute that the conversion of ester to oxime virtually stops. The termination of the reaction is then indicated by the cessation of evolution of carbon monoxide gas from the reaction mixture.

The oximes produced by my process can then be recovered by any suitable means. One such means consists of neutralizing the reaction mixture with a base such as an aqueous solution of sodium hydroxide and extracting the oxime from the solution with a suitable solvent for the oxime.

The esters which I employ in carrying out my process can be obtained by reacting the corresponding nitro alcohol with an anhydride such as acetic anhydride or propionic anhydride. This reaction is ordinarily conducted at room temperature or slightly above utilizing a basic catalyst such as pyridine.

The following specific examples will further illustrate my invention, but it is not intended that my invention be limited to specific amounts, procedures, or esters set forth therein. Rather, I intend to include within the scope of my invention all equivalents obvious to those skilled in the art.

Example I

To 40 milliliters of 85% sulfuric acid having a temperature of about 25° C. were slowly added 20 grams of nitrocyclohexanemethyl acetate with accompanying agitation. After the addition was complete the resulting mixture was then heated to about 70° C. until evolution of carbon monoxide gas ceased. The solution was then immediately neutralized to pH 7 with aqueous sodium hydroxide. The neutralized material was then extracted with 100 milliliters of ethyl ether. The ethereal extract was then evaporated to give 9 grams of cyclohexanone oxime (80% yield).

Example II

To 50 milliliters of 75% sulfuric acid having a temperature of about 25° C. were slowly added 16.1 grams of 2-nitro-2-methylpropyl acetate with accompanying agitation. On completion of the addition, the resulting mixture was then heated to about 40° C. until evolution of carbon monoxide gas ceased. The solution was then neutralized to pH 7 with aqueous sodium hydroxide. The neutralized material was then extracted with 100 milliliters of ethyl ether. The ethereal extract was then evaporated to give 6.0 grams of acetone oxime (95% yield).

Example III 2-nitro-2-methylpropyl propionate and 75% sulfuric acid were reacted following the procedure of Example II to give acetone oxime.

Now having described my invention, what I claim is:
1. A process for the production of an oxime of the formula R=NOH which comprises treating a compound having the following structural formula:

$$\underset{|}{\overset{NO_2}{\phantom{X}}}\phantom{X}\underset{\phantom{X}}{\overset{O}{\phantom{X}}}$$
$$R-CH_2-O-\overset{\|}{C}-R^1$$

wherein R is selected from the group consisting of cycloalkyl and the radical:

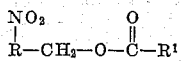

and wherein $R^1$ is alkyl with sulfuric acid to produce said oxime.

2. A process for the production of an oxime of the formula R=NOH which comprises treating a compound having the following structural formula:

$$\underset{|}{\overset{NO_2}{\phantom{X}}}\phantom{X}\underset{\phantom{X}}{\overset{O}{\phantom{X}}}$$
$$R-CH_2-O-\overset{\|}{C}-R^1$$

wherein R is selected from the group consisting of cycloalkyl and the radical:

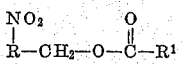

and wherein $R^1$ is alkyl with sulfuric acid at a temperature ranging from about 0 to about 100° C. to produce said oxime.

3. A process for the production of an oxime of the formula R=NOH which comprises treating a compound having the following structural formula:

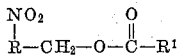

wherein R is selected from the group consisting of cycloalkyl and the radical:

and wherein $R^1$ is alkyl with aqueous sulfuric acid having a concentration of not less than 50% to produce said oxime.

4. A process for the production of an oxime of the formula R=NOH which comprises treating a compound having the following structural formula:

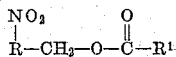

wherein R is selected from the group consisting of cycloalkyl and the radical:

and wherein $R^1$ is alkyl with aqueous sulfuric acid having a concentration ranging from about 50 to about 100% at a temperature ranging from about room temperature to about 80° C. to produce said oxime and recovering the oxime produced.

5. A process for the production of an oxime of the formula R=NOH which comprises treating a compound having the following structural formula:

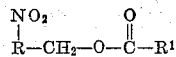

wherein R is selected from the group consisting of cycloalkyl and the radical:

and wherein $R^1$ is alkyl with sulfuric acid to produce said oxime, neutralizing the reaction mixture, extracting the oxime from the reaction mixture with ethyl ether and evaporating the ethyl ether solution to obtain the oxime.

6. A process for the production of cyclohexanone oxime which comprises treating nitrocyclohexane-methyl acetate with aqueous sulfuric acid having a concentration ranging from about 50 to about 100% at a temperature ranging from about 0° C. to about 100° C. to produce cyclohexanone oxime and recovering the oxime produced.

7. A process for the production of acetone oxime which comprises treating 2-nitro-2-methylpropyl acetate with aqueous sulfuric acid having a concentration ranging from about 50 to about 100% at a temperature ranging from about 0° C. to about 100° C. to produce acetone oxime and recovering the oxime produced.

8. A process for the production of acetone oxime which comprises treating 2-nitro-2-methylpropyl propionate with aqueous sulfuric acid having a concentration range from about 50 to about 100% at a temperature ranging from about 0° C. to about 100° C. to produce acetone oxime and recovering the oxime produced.

References Cited in the file of this patent

UNITED STATES PATENTS

| | | |
|---|---|---|
| 2,237,365 | Schlack | Apr. 8, 1941 |
| 2,755,171 | Jones | July 17, 1956 |

OTHER REFERENCES

Fieser et al.: "Organic Chemistry," 2nd ed., page 179 (1950).

Wagner et al.: "Synthetic Organic Chemistry," page 739 (1953).